(12) United States Patent
Yamamoto et al.

(10) Patent No.: US 10,252,637 B2
(45) Date of Patent: Apr. 9, 2019

(54) SADDLE-RIDE VEHICLE

(71) Applicant: HONDA MOTOR CO., LTD., Tokyo (JP)

(72) Inventors: Kanta Yamamoto, Wako (JP); Daisuke Kuriki, Wako (JP); Masamoto Ito, Wako (JP); Naoki Yoshida, Wako (JP); Masayoshi Takano, Wako (JP); Shigehiro Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/474,346

(22) Filed: Mar. 30, 2017

(65) Prior Publication Data
US 2017/0282748 A1    Oct. 5, 2017

(30) Foreign Application Priority Data

Mar. 31, 2016  (JP) ................................. 2016-071511
Sep. 30, 2016  (JP) ................................. 2016-194615

(51) Int. Cl.
*B60K 11/06*    (2006.01)
*B60L 11/18*    (2006.01)
*B62K 11/02*    (2006.01)
*B62M 7/04*    (2006.01)
*B62J 17/02*    (2006.01)
*H01M 8/04014*    (2016.01)

(52) U.S. Cl.
CPC .......... *B60L 11/1892* (2013.01); *B60K 11/06* (2013.01); *B60L 11/1896* (2013.01);
(Continued)

(58) Field of Classification Search
CPC .............. B60L 11/1892; B60L 11/1881; B60L 11/1896; B60K 11/06; B62J 17/02;
(Continued)

(56) References Cited

U.S. PATENT DOCUMENTS 7,921,947 B2    4/2011  Horii et al.
2002/0162693 A1*  11/2002  Mizuno ............... B60L 11/1881
                                                      180/65.1

(Continued)

FOREIGN PATENT DOCUMENTS

CN    101332767 A    12/2008
CN    104554558 A    4/2015
(Continued)

OTHER PUBLICATIONS

Extended European Search Report issued in European Application No. 17163875.2 dated Oct. 11, 2017.

*Primary Examiner* — Joseph M Rocca
*Assistant Examiner* — Marlon A Arce
(74) *Attorney, Agent, or Firm* — Birch, Stewart, Kolasch & Birch, LLP

(57) ABSTRACT

A saddle-ride type vehicle includes a vehicle body frame steerably supporting a front fork by a head pipe and swingably supporting a rear wheel unit around a pivot, an air-cooled type fuel cell unit supported by the vehicle body frame on a rear side of the head pipe and including an outside air intake port facing forward, and a vehicle body cover defining a front of an intake air space that is connected to the intake port. The vehicle body cover includes a traveling air passage changing a direction of traveling air that flows in from a front. Accordingly, it is possible to efficiently supply traveling air to a fuel cell unit that includes a fuel cell.

11 Claims, 8 Drawing Sheets

(52) U.S. Cl.
CPC ........... *B60L 11/1898* (2013.01); *B62J 17/02* (2013.01); *B62K 11/02* (2013.01); *B62M 7/04* (2013.01); *H01M 8/04014* (2013.01); *B60L 2200/12* (2013.01); *H01M 2250/20* (2013.01); *Y02T 90/32* (2013.01)

(58) Field of Classification Search
CPC ..... B62K 11/02; B62M 7/04; H01M 8/04014; H01M 2250/20; Y02T 90/32
See application file for complete search history.

(56) References Cited

U.S. PATENT DOCUMENTS

| | | | |
|---|---|---|---|
| 2013/0015008 A1* | 1/2013 | Yama | B62J 17/00 180/68.6 |
| 2013/0302713 A1* | 11/2013 | Yamamoto | H01M 8/04201 429/442 |
| 2016/0056482 A1* | 2/2016 | Otsuka | B60L 11/1898 180/220 |
| 2016/0121964 A1* | 5/2016 | Nagaya | B62M 7/12 180/220 |

FOREIGN PATENT DOCUMENTS

| | | |
|---|---|---|
| JP | 61-125921 A | 6/1986 |
| JP | 61-204884 U | 12/1986 |
| JP | 2001-351652 A | 12/2001 |
| JP | 2002-37167 A | 2/2002 |
| JP | 2009-78622 A | 4/2009 |
| WO | WO 2013/061387 A1 | 5/2013 |

\* cited by examiner

SADDLE-RIDE VEHICLE

BACKGROUND OF THE INVENTION

Field of the Invention

The present invention relates to a saddle-ride type vehicle including a fuel cell.

Description of the Related Art

A saddle-ride type vehicle including a fuel cell has been generally known. As described in Japanese Patent Application Laid-Open No. 2009-078622 for example, a saddle-ride type vehicle includes a fuel cell that generates electric power based on a chemical reaction of oxygen in atmospheric air and hydrogen. The fuel cell is stored inside a cowl. An intake port for air opens in a side surface of the cowl. A cooling fan is disposed underneath the fuel cell. The cooling fan cools the fuel cell by introducing air to underneath the fuel cell, the air having been taken in from above the fuel cell and being used for reaction with fuel, and discharges warm exhaust air after having cooled the fuel cell, toward a fuel cylinder.

Since a traveling air intake port is located on the vehicle an upper side of the vehicle with respect to a stack, a flow of traveling air to the stack deteriorates. Also, since a shape of the traveling air intake port has not been devised, the traveling air to the stack is supplied in a turbulent flow state.

SUMMARY OF THE INVENTION

The present invention has been achieved in view of the above-mentioned circumstances, and it is an object thereof to provide a saddle-ride type vehicle capable of efficiently supplying traveling air to a fuel cell unit that includes a fuel cell.

In order to achieve the object, according to a first feature of the present invention, there is provided a saddle-ride type vehicle, comprising: a vehicle body frame steerably supporting a front fork by a head pipe and swingably supporting a rear wheel unit around a pivot, an air-cooled type fuel cell unit supported by the vehicle body frame on a rear side of the head pipe and including an outside air intake port facing forward, and a vehicle body cover defining a front of an intake air space that is connected to the intake port, wherein the vehicle body cover includes a traveling air passage that changes a direction of traveling air that flows in from a front.

With the first feature, while the saddle-ride type vehicle travels, the traveling air flows in to the traveling air passage from the front in the traveling direction, and is supplied from the traveling air passage to the intake air space. As the vehicle travels, the air flows in naturally to the traveling air passage. The traveling air passage guides the travelling air toward the intake air space while changing the direction of the traveling air. Thus, the traveling air is supplied efficiently to the fuel cell unit.

According to a second feature of the present invention, in addition to the first feature, the traveling air passage includes a turning portion on a rear side of the intake port, the traveling air passage guiding the traveling air toward the front.

With the second feature, while the saddle-ride type vehicle travels, the traveling air flows in to the fuel cell unit from the intake port after having been guided toward the front at the turning portion. Although water and dust are taken in together with the air from the traveling air passage of the vehicle body cover, the water and dust receive an inertia force of the air stream at the turning portion and stay at the turning portion. Thus, the water and dust are prevented from entering the fuel cell unit. Also, since the air that enters in a turbulent flow state is rectified by the turning portion, efficient air guiding is achieved.

According to a third feature of the present invention, in addition to the second feature, the vehicle body cover includes a front wall and side walls, the front wall covering a front of the intake port, the side walls extending rearward of the vehicle from the front wall, left and right intake air ports are defined in the side walls, the intake air ports being connected to the intake air space and opening toward a rear, and the turning portion includes an air guide plate joined to the side wall on a rear side of the intake air port, the air guide plate covering the intake air port and forming a traveling air intake port that opens toward the front.

With the third feature, the turning portion can be formed by the side wall of the vehicle body cover, the intake air port that is defined in the side wall, and the air guide plate. The traveling air can be rectified efficiently by less number of component.

According to a fourth feature of the present invention, in addition to the third feature, the air guide plate is arranged so as to extend outwardly as going forward of the vehicle.

With the fourth feature, since the air guide plate extends to the outer side as it goes toward the front of the vehicle, flowing in of the traveling air is promoted.

According to a fifth feature of the present invention, in addition to the third feature or the fourth feature, the side wall includes a first guide portion that forms the intake air port, the first guide portion being arranged so as to extend outwardly as going rearward of the vehicle.

With the fifth feature, the traveling air that flows in from the front goes around the intake air port toward the outside and is guided to the turning portion along the inside of the air guide plate by action of the first guide portion. The air flow that turns from the turning portion is guided by the first guide portion and is introduced efficiently to the intake air port. Thus, efficient air guiding is achieved.

According to a sixth feature of the present invention, in addition to the fifth feature, the intake air port is positioned on the rear side of the intake port.

With the sixth feature, the air flow that turns from the turning portion flows to the front from the intake air port, and flows in to the intake air space in front of the intake port. Therefore, the water and dust can be suppressed from entering the fuel cell unit.

According to a seventh feature of the present invention, in addition to the sixth feature, the side wall includes a fuel cell cover portion, a front end of the fuel cell cover portion including a second guide portion that is folded so as to be oriented to the fuel cell unit.

With the seventh feature, the second guide portion efficiently guides, to the intake air port, the air flow turning from the turning portion. Thus, efficient air guiding is achieved. Much amount of the air flow can be introduced to the fuel cell unit.

According to an eighth feature of the present invention, in addition to the third feature or the fourth feature, an opening is provided in the air guide plate, the opening opening between the intake air port and a rear end of the air guide plate.

With the eighth feature, a part of the air flow that flows to the rear along the air guide plate flows to the outside through the opening. The air pressure applied to the air guide plate by the traveling air during travel can be reduced.

According to a ninth feature of the present invention, in addition to the eighth feature, the opening is disposed so as to deviate to an upper edge or a lower edge of the air guide plate.

With the ninth feature, overlapping of the opening and the intake air port can be avoided as much as possible. Therefore, in spite of the existence of the opening, the air flow of a sufficient flow rate can flow in from the turning portion toward the intake air port.

According to a tenth feature of the present invention, in addition to the third feature or the fourth feature, the vehicle body cover includes an inlet cover covering a second intake air port and including a traveling air passage, the second intake air port being defined in the front wall of the vehicle body cover, the traveling air passage changing a direction of a traveling air that flows in toward the second intake air port from the front.

With the tenth feature, since the second intake air port is opened forward, the traveling air easily flows in to the fuel cell unit while the saddle-ride type vehicle travels. Also, since the second intake air port is covered by the inlet cover, the water and dust splashed by the front wheel do not enter the intake air port directly, and the water and dust are prevented from entering the fuel cell unit.

The above and other objects, characteristics and advantages of the present invention will be clear from detailed descriptions of the preferred embodiment which will be provided below while referring to the attached drawings.

DESCRIPTION OF THE PREFERRED EMBODIMENT

Hereinafter, an embodiment of the present invention will be explained referring to the attached drawings. Here, up, down, front, rear, left, and right of a vehicle body are to be defined based on the eye line of an occupant riding on a two-wheeled motor vehicle.

Figure 1:
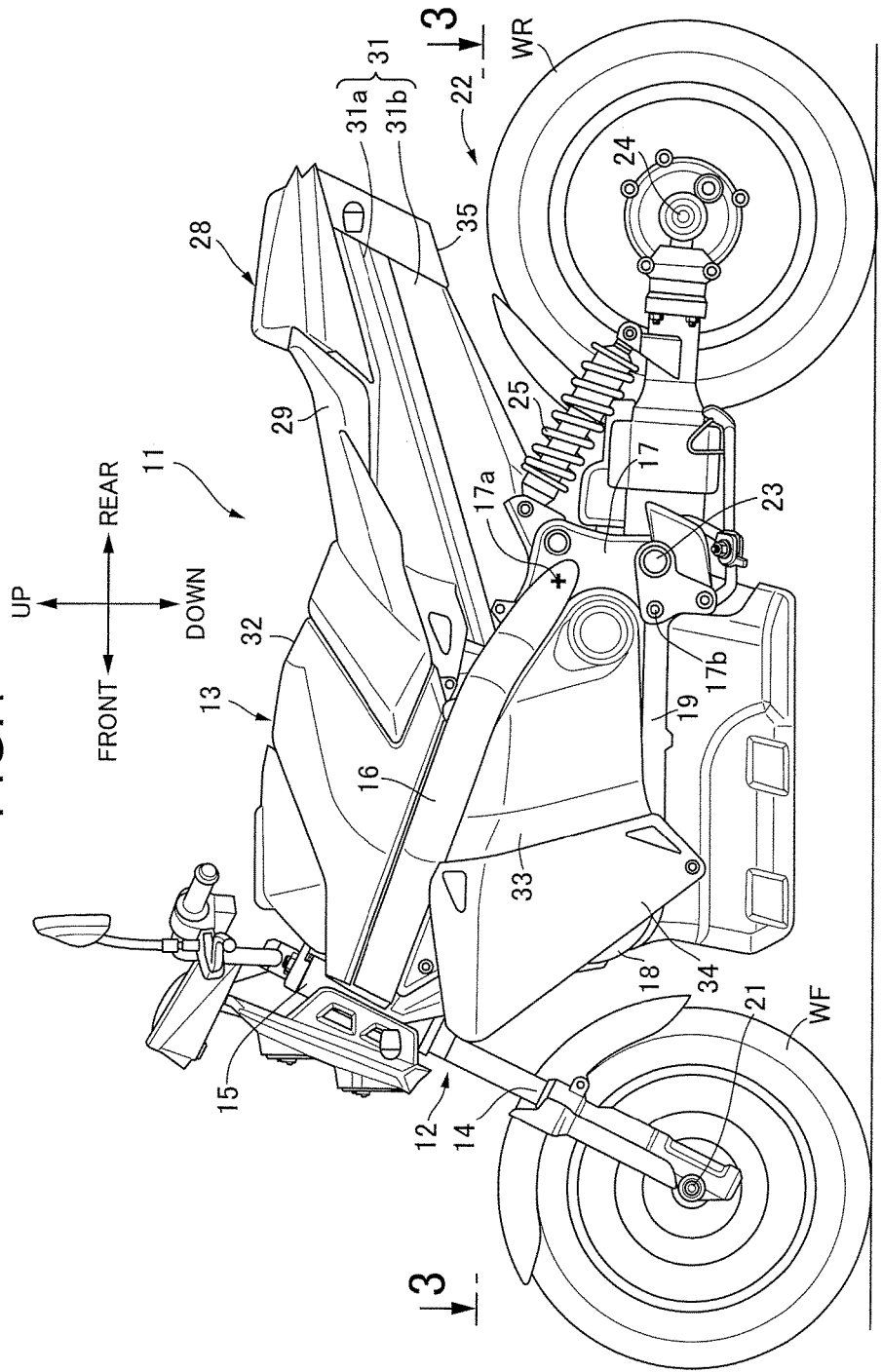
FIG. 1 is a side view schematically showing an entire configuration of a saddle-ride type vehicle namely a two-wheeled motor vehicle according to an embodiment of the present invention.

FIG. 1 schematically shows a saddle-ride type vehicle, namely a two-wheeled motor vehicle according to an embodiment of the present invention. A two-wheeled motor vehicle (saddle-ride type vehicle) 11 includes a vehicle body frame 12 and a vehicle body cover 13 furnished in the vehicle body frame 12. The vehicle body frame 12 includes a head pipe 15, a pair of left and right main frames 16, a pair of left and right pivot frames 17, a pair of left and right down frames 18, and a pair of left and right lower frames 19. The head pipe 15 steerably supports a front fork 14, the main frames 16 extend downwardly to the rear at a first angle with respect to the horizontal plane from the head pipe 15, the pivot frames 17 are joined to the rear ends of the main frames 16 at first connection points 17a and extend downwardly from the rear ends of the main frames 16, the down frames 18 extend downwardly at a second angle with respect to the horizontal plane from the head pipe 15, the second angle being larger than the first angle, and the lower frames 19 extend from the rear ends of the down frames 18 and are connected to the pivot frames 17 at second connection points 17b that are underneath the first connection points 17a. A front wheel WF is supported by the front fork 14 so as to be rotatable around an axle 21.

The two-wheeled motor vehicle 11 includes a rear wheel unit 22. The rear wheel unit 22 is connected to the pivot frame 17 through a pivot 23 that extends in the horizontal direction. The rear wheel unit 22 is supported by the pivot frame 17 so as to be swingable up and down around the pivot 23. A rear wheel WR is supported by the free end of the rear wheel unit 22 so as to be rotatable around an axle 24 that is parallel to the pivot 23. A rear cushion 25 is arranged between the vehicle body frame 12 and the rear wheel unit 22. One end of the rear cushion 25 is connected to the pivot frame 17 above the pivot 23. The rear cushion 25 restricts swinging of the rear wheel unit 22 with respect to the vehicle body frame 12. Transmission of vibration from the rear wheel WR to the vehicle body frame 12 is suppressed. The rear wheel unit 22 includes an electric motor 26 that is connected to the rear wheel WR and drives the rear wheel WR based on the electric power supplied.

The two-wheeled motor vehicle 11 includes a fuel supply assembly 28. The fuel supply assembly 28 is connected to the main frame 16 above the pivot frame 17. The fuel supply assembly 28 includes a seat frame 31 that extends to the rear on the upper side of the rear wheel WR from the main frame 16 and supports an occupant seat 29. The seat frame 31 has a monocoque structure having the shape of an exhaust duct that guides exhaust gas from the fuel cell unit to the rear of the occupant seat 29 as described below.

The seat frame 31 includes an upper body 31a and a lower body 31b. The upper body 31a and the lower body 31b are joined to each other. The joining surface of the upper body 31a and the lower body 31b extends from the main frame 16 to the rear end. The occupant seat 29 is mounted on the upper body 31a. The occupant straddles the occupant seat 29.

The vehicle body cover 13 includes an upper cover 32, side covers 33, air guide plates 34, and a rear cover 35. The upper cover 32 is joined commonly to the upper sides of the left and right main frames 16, the side covers 33 are respectively joined to the main frames 16 at the lower sides of the main frames 16, the air guide plate 34 extends forward from the rear end thereof that is joined to the side cover 33, and the rear cover 35 covers the seat frame 31 on the rear side of the occupant seat 29. The upper cover 32 straddles the two main frames 16 from above is joined thereto. The rear cover 35 forms the exhaust port at the rear end of the seat frame 31.

Figure 2:
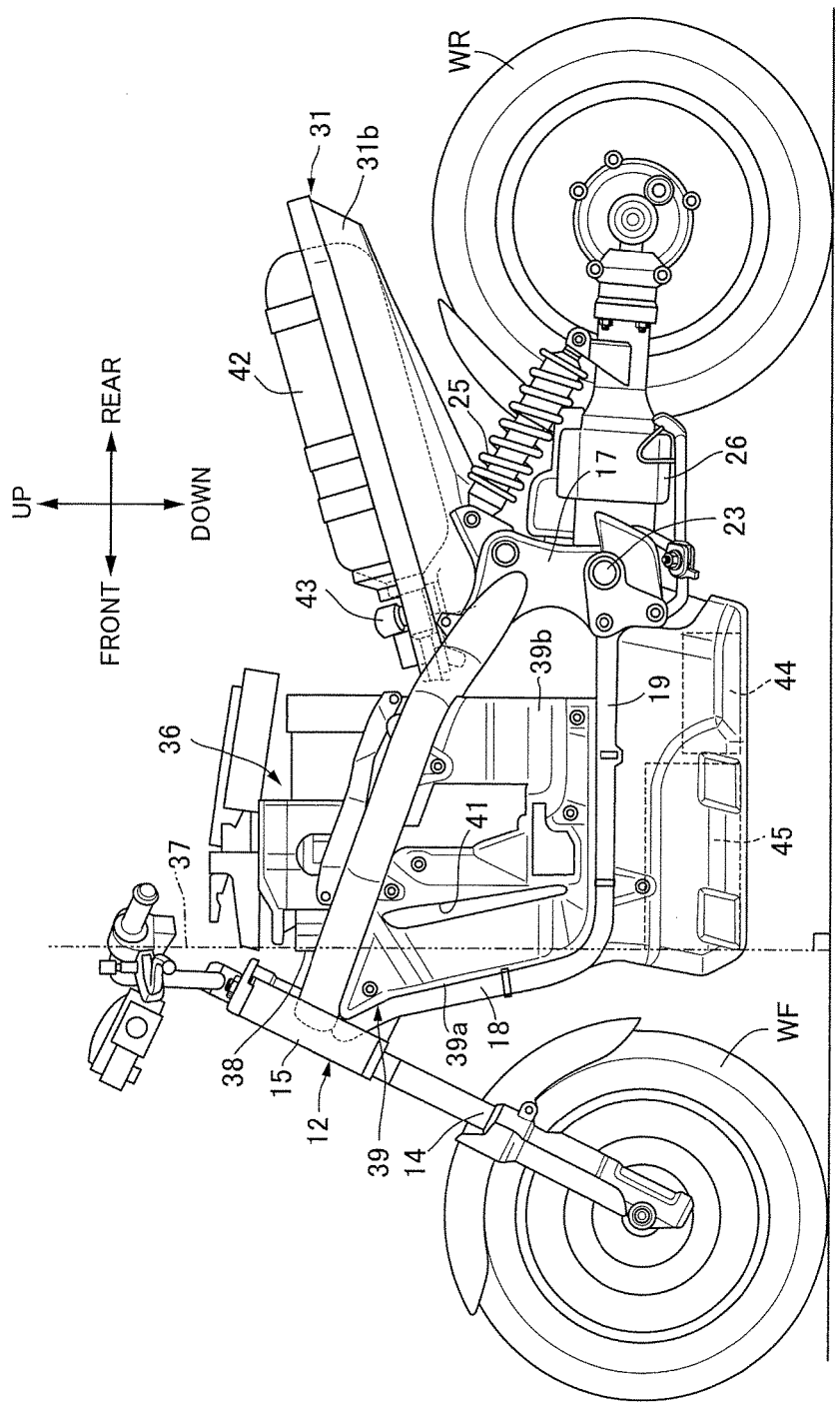
FIG. 2 is a side view schematically showing an entire image of the two-wheeled motor vehicle in a state where a vehicle body cover is detached.

As shown in FIG. 2, an air-cooled type fuel cell unit 36 is mounted on the vehicle body frame 12. The fuel cell unit 36 is supported by the pair of left and right lower frames 19 from the underneath on the rear side of the head pipe 15. The down frames 18 extend at the front of the fuel cell unit 36.

The fuel cell unit 36 disposes an intake port 38 of the outside air along an imaginary plane 37 facing forward, the imaginal plane 37 being perpendicular to the ground surface and extending in the vehicle right and left direction. In the fuel cell unit 36, electric power is generated based on the chemical reaction of oxygen in the atmospheric air and hydrogen. In supplying and cooling oxygen, the fuel cell unit 36 utilizes the atmospheric air that flows in through the intake port 38.

The vehicle body cover 13 includes a cover body 39 in addition to the upper cover 32, the side covers 33, the air guide plates 34, and the rear cover 35, the cover body 39 being covered by the side covers 33 and the air guide plates 34. The cover body 39 is connected to the vehicle body frame 12. The cover body 39 includes a front wall 39a and a pair of left and right side walls 39b. The side wall 39b is configured with a first guide portion 49b and a fuel cell cover portion 49a, and the first guide portion 49b extends toward the rear of the vehicle. Left and right intake air ports 41 are defined in the side walls 39b.

A fuel tank 42 having a cylindrical shape is mounted on the vehicle body frame 12. The fuel tank 42 extends to the rear from a pressure control valve 43 that is connected to the fuel cell unit 36. The fuel tank 42 stores high pressure hydrogen. The lower body 31b of the seat frame 31 supports the fuel tank 42 from the underneath. The fuel tank 42 is stored inside the seat frame 31.

A control device 44 is mounted on the vehicle body frame 12. The control device 44 is disposed underneath the fuel tank 42 and in front of the rear wheel WR. The control device 44 controls electric power supplied from the fuel cell unit 36 and electric power supplied to the electric motor 26.

A secondary battery 45 is mounted on the vehicle body frame 12. The secondary battery 45 is disposed so as to be juxtaposed to and in front of the control device 44 underneath the fuel cell unit 36. The secondary battery 45 charges and discharges electric power according to control of the control device 44.

Figure 3:
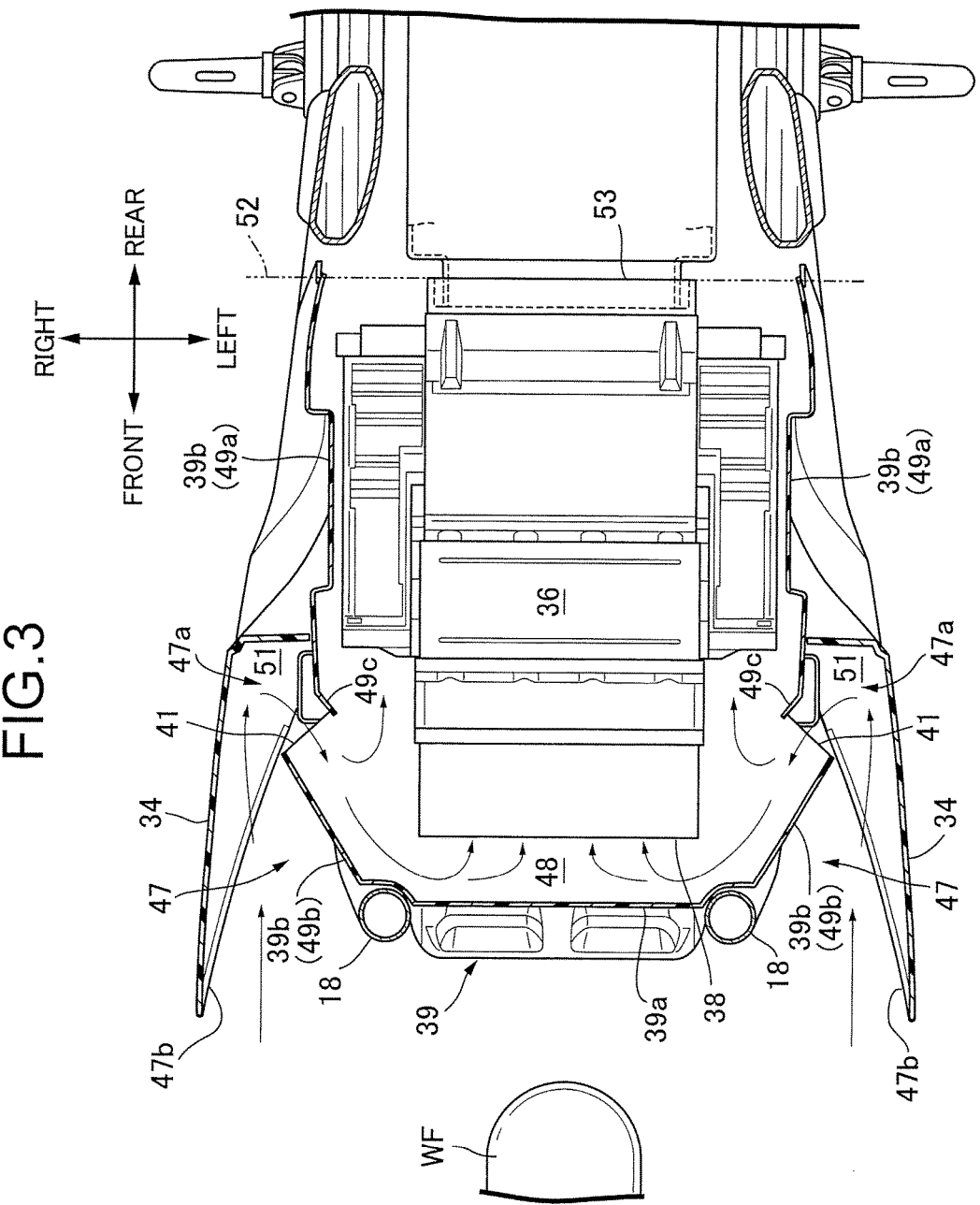
FIG. 3 is an enlarged horizontal sectional view taken along line 3-3 of FIG. 1.

As shown in FIG. 3, the vehicle body cover 13 includes traveling air passages 47 that change the direction of the traveling air flowing in from the front. The traveling air passage 47 is connected to an intake air space 48 defined in front of the intake port 38 by the front wall 39a of the cover body 39 that is disposed in front of the intake port 38. The intake air space 48 is connected to the intake port 38. The traveling air passage 47 includes a turning portion 47a of the traveling air on the rear side of the intake port 38. The turning portion 47a guides the traveling air toward the front. In forming the turning portion 47a, the intake air port 41 opens rearward while communicating with the intake air space 48. The air guide plate 34 is joined to the side wall 39b of the cover body 39 on the rear side of the intake air port 41. The air guide plate 34 extends toward the front of the vehicle on the lateral side of the intake air port 41 and the side wall 39b while facing the intake air port 41 with an introduction space 51 therebetween. The air guide plate 34 forms a traveling air intake port 47b opening forward.

The side wall 39b includes the fuel cell cover portion 49a and the first guide portion 49b, the fuel cell cover portion 49a covering the side surface of the fuel cell unit 36, the first guide portion 49b forming the intake air port 41 in front of the fuel cell cover portion 49a. The first guide portion 49b extends outward in the vehicle width direction as it goes to the rear. On the other hand, a second guide portion 49c is formed in the side wall 39b, the second guide portion 49c being continuous from the rear edge of the intake air port 41 and deflecting inward and approaching the intake air space 48 as it goes to the front. The opening of the intake air port 41 is defined between the front end of the second guide portion 49c and the first guide portion 49b. The second guide portion 49c may be formed so as to be continuous from and integral with the side wall 39b, or may be attached to the side wall 39b as a separate member.

The fuel cell unit 36 disposes a discharge port 53 along an imaginary plane 52 facing rearward, the imaginary plane 52 being perpendicular to the ground surface and extending in the vehicle right and left direction. In the fuel cell unit 36, the air flow circulates inside a case from the intake port 38 described above toward the discharge port 53 by action of a built-in fan unit.

Figure 4:
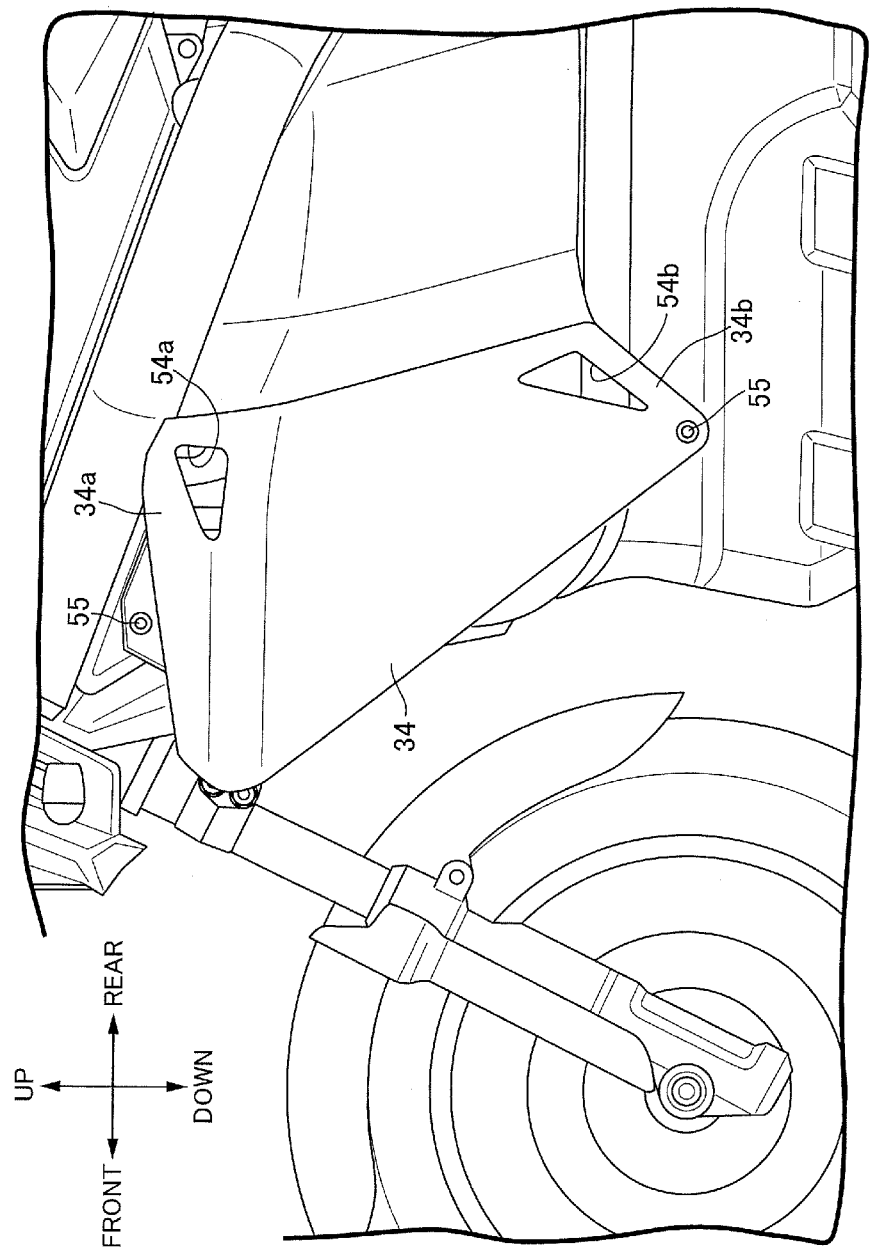
FIG. 4 is an enlarged side view of the two-wheeled motor vehicle showing an enlarged air guide plate.
Figure 5:
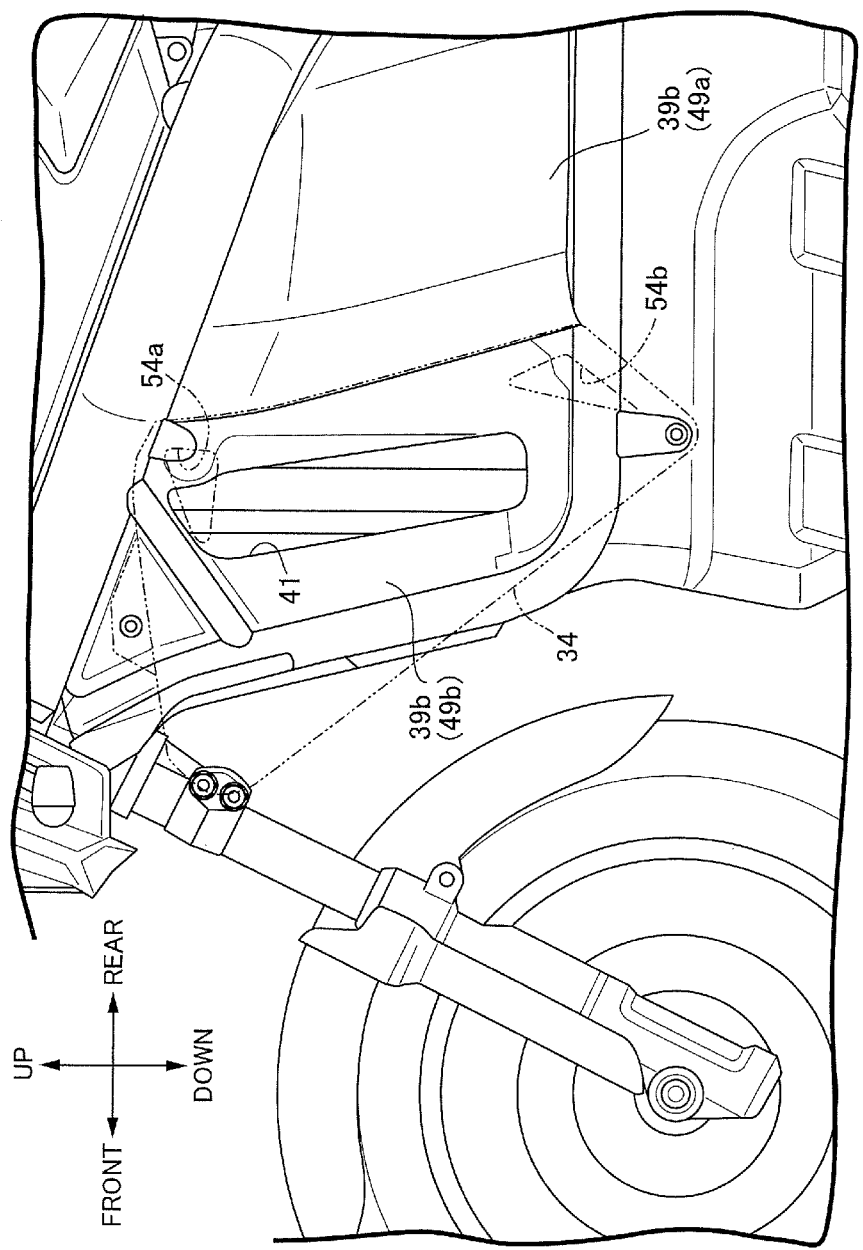
FIG. 5 corresponds to FIG. 4, and is an enlarged side view of the two-wheeled motor vehicle showing an enlarged intake air port.

As shown in FIG. 4, two openings 54a, 54b are provided in the upper and lower sides of the air guide plate 34 along the rear end thereof. Each of the openings 54a, 54b connects the outside space to the introduction space 51. The openings 54a, 54b are disposed so as to deviate to an upper edge 34a and a lower edge 34b of the air guide plate 34. As shown in FIG. 5, the openings 54a, 54b open between the intake air port 41 and the rear edge of the air guide plate 34. The air guide plate 34 is joined to the side wall 39b of the cover body 39 at the rear end, and is joined to the side wall 39b of the cover body 39 on the front side of the openings 54a, 54b by fastening tools 55 such as screws for example.

Figure 6:
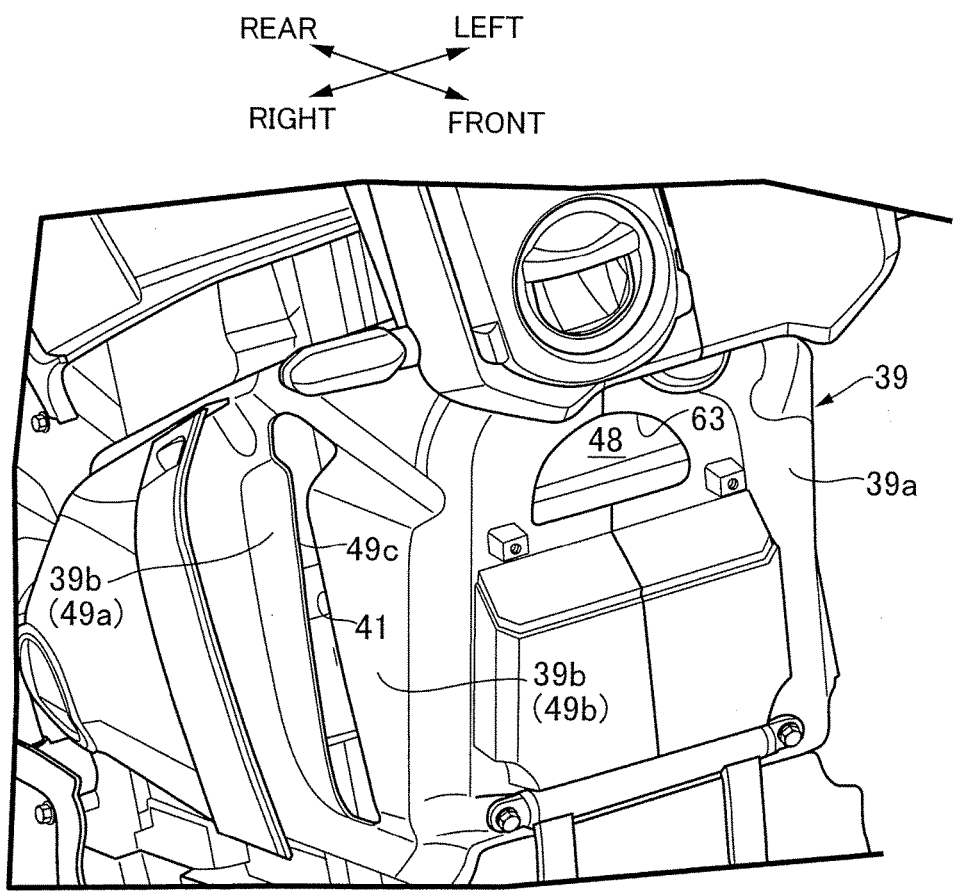
FIG. 6 is an enlarged perspective view of the two-wheeled motor vehicle showing the intake air port of a front wall.
Figure 7:
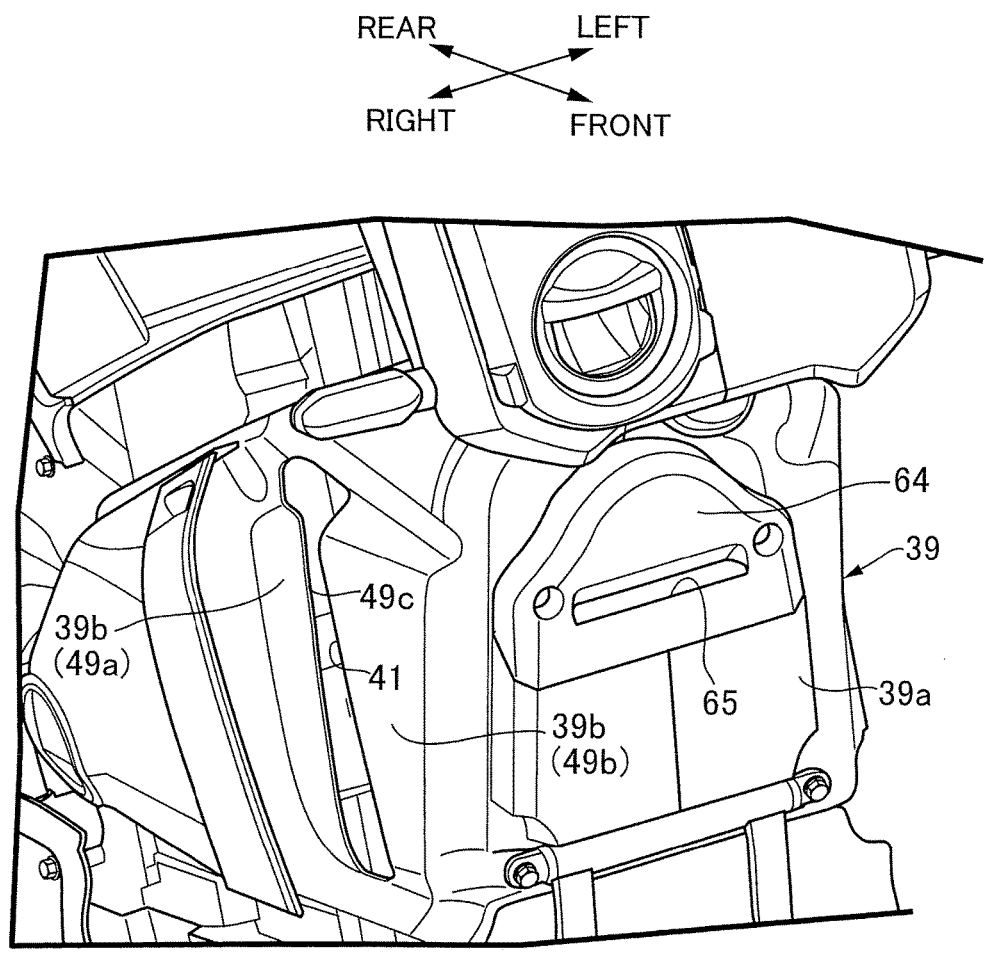
FIG. 7 corresponds to FIG. 6, and is an enlarged perspective view of the two-wheeled motor vehicle showing an inlet cover that is furnished in the intake air port of the front wall.

As shown in FIG. 6, a second intake air port 63 is defined at the upper portion of the front wall 39a of the cover body 39. The second intake air port 63 is opened forward. The second intake air port 63 communicates with the intake air space 48. As shown in FIG. 7, an inlet cover 64 is attached to the front wall 39a of the cover body 39 in front of the second intake air port 63. The inlet cover 64 covers the second intake air port 63 from the front. The inlet cover 64 includes an introduction port 65 that opens toward the front. During traveling, the traveling air is introduced to the inlet cover 64 through the introduction port 65.

Figure 8:
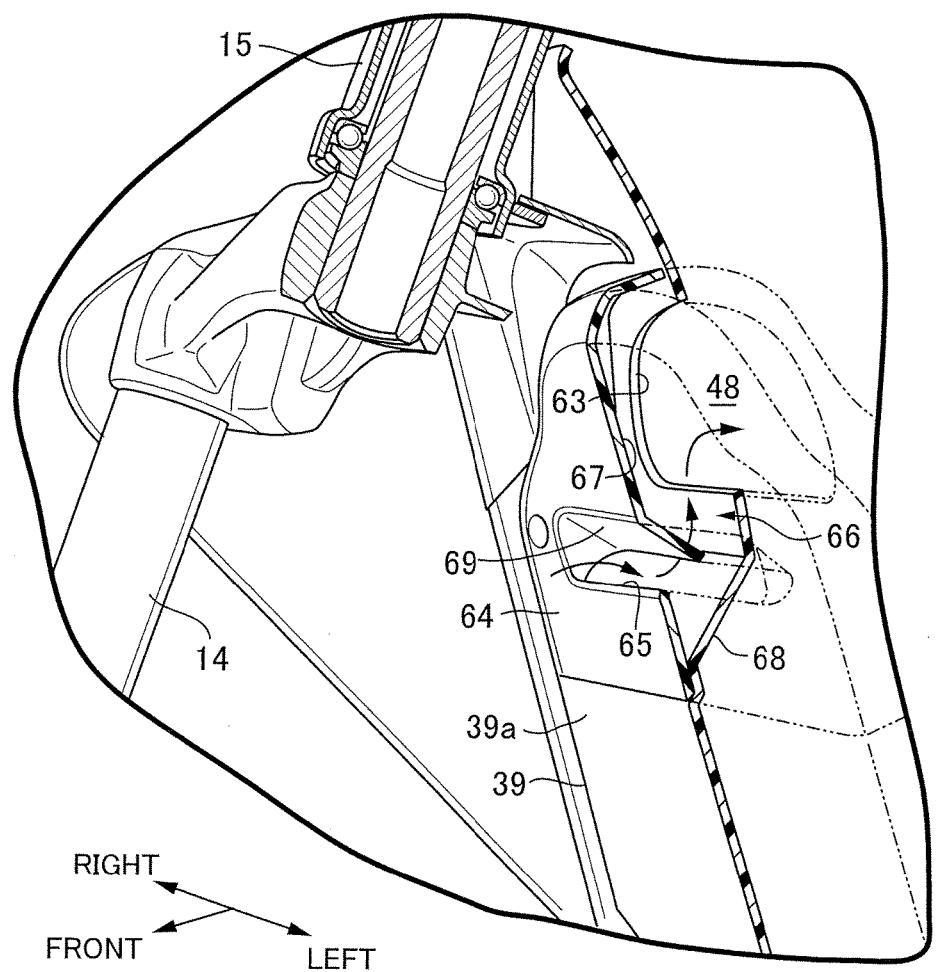
FIG. 8 is an enlarged partial perspective view schematically showing a traveling air passage of the inlet cover.

As shown in FIG. 8, the inlet cover 64 includes a traveling air passage 66 that is continuous from the introduction port 65 and changes the direction of the traveling air which flows in from the front. The traveling air passage 66 is connected to the intake air space 48 described above. The traveling air passage 66 includes a ventilation space 67 that is defined between the inlet cover 64 and the front surface of the front wall 39a. The ventilation space 67 is partitioned by an inclined wall 68 that is deflected toward the front as it departs downward from the second intake air port 63 on the lower side of the second intake air port 63.

The inlet cover 64 is defined by a rectifying plate 69 that is formed at the upper edge of the introduction port 65 and extends downward as it deflects rearward from the opening. The rectifying plate 69 rectifies the air flow downwardly, the air flow having been taken in through the introduction port 65. The air flow having been taken in enters the second intake air port 63 on the upper side after colliding with the inclined wall 68 of the front wall 39a.

While the two-wheeled motor vehicle 11 travels, the traveling air flows in to the traveling air passages 47 from the front in the vehicle traveling direction, and is supplied to the intake air space 48 from the traveling air passages 47. As the two-wheeled motor vehicle 11 travels, the air naturally flows in to the traveling air passages 47. The traveling air passages 47 guide the traveling air toward the intake air space 48 while changing the direction of the traveling air. Thus, the traveling air is supplied efficiently to the fuel cell unit 36.

Furthermore, the traveling air passage 47 includes the turning portion 47a on the rear side of the intake port 38, the turning portion 47a guiding the traveling air toward the front. While the two-wheeled motor vehicle 11 travels, the traveling air flows in to the fuel cell unit 36 from the intake port 38 after being guided toward the front at the turning portion 47a. Although the water and dust are taken in together with the air from the traveling air passage 47 of the vehicle body cover 13, the water and dust receive an inertia force of the air flow at the turning portion 47a, and stay in the turning portion 47a. Thus, the water and dust are prevented from entering the fuel cell unit 36. Also, efficient air guiding is achieved by rectifying, by means of the turning portion 47a, the air entering in a turbulent flow state.

According to the present embodiment, the turning portion 47a is formed by the side wall 39b of the vehicle body cover 13, the intake air port 41 that is defined in the side wall 39b, and the air guide plate 34. Thus, the traveling air can be rectified efficiently with less number of component. Since the air guide plate 34 extends to the outside as it goes toward the front of the vehicle, flowing in of the traveling air is promoted.

The first guide portion 49b is connected to the front wall 39a at the front end thereof, departs outwardly from the intake air space 48 as it goes to the rear, and defines the intake air port 41 between the rear end of the first guide portion 49b and the fuel cell cover portion 49a. The traveling air that flows in from the front goes around the intake air port 41 toward the outside, and is guided to the turning portion 47a along the inside of the air guide plate 34 by action of the first guide portion 49b. The air flow that turns from the turning portion 47a is guided by the first guide portion 49b, and is introduced efficiently to the intake air port 41. Thus, efficient air guiding is achieved.

The intake air port 41 is positioned on the rear side of the intake port 38. The air flow that turns from the turning portion 47a flows forward from the intake air port 41, and flows in to the intake air space 48 in front of the intake port 38. Therefore, the water and dust are surely prevented from entering the fuel cell unit 36. Efficient air guiding is achieved by rectifying, by means of the turning portion 47a, the air entering in a turbulent flow state.

The front end of the fuel cell cover portion 49a includes the second guide portion 49c that is folded so as to be oriented to the fuel cell unit 36. The second guide portion 49c guides efficiently, to the intake air port 41, the air flow turning from the turning portion 47a. Thus, efficient air guiding is achieved. Much amount of the air flow can be introduced to the fuel cell unit 36.

The openings 54a, 54b are provided in the air guide plate 34, the openings 54a, 54b opening between the intake air port 41 and the rear end of the air guide plate 34. A part of the air flow that flows to the rear along the air guide plate 34 flows out to the outside through the openings 54a, 54b. The air pressure applied to the air guide plate 34 by the traveling air during travel can be reduced. For example, when the two-wheeled motor vehicle 11 is laid down on its side, warm air existing inside the air guide plate 34 can escape to the outside space through the openings 54a, 54b. Thus, temperature rise of the air guide plate 34 can be suppressed.

The openings 54a, 54b are disposed close to the upper edge 34a or the lower edge 34b of the air guide plate 34. Overlapping of the openings 54a, 54b and the intake air port 41 can be avoided as much as possible. Therefore, in spite of the existence of the openings 54a, 54b, the air flow of a sufficient flow rate can flow in from the turning portion 47a toward the intake air port 41.

The inlet cover 64 is fixed to the vehicle body cover 13, the inlet cover 64 covering the second intake air port 63 and including the traveling air passage 66, the second intake air port 63 being defined in the front wall 39a of the vehicle body cover 13, the traveling air passage 66 changing the direction of the traveling air that flows in toward the second intake air port 63 from the front. Since the second intake air port 63 is opened forward, the traveling air easily flows in to the fuel cell unit 36 while the saddle-ride type vehicle 11 travels. Also, since the second intake air port 63 is covered by the inlet cover 64, the water and dust splashed by the front wheel WF do not enter the second intake air port 63 directly, and the water and dust are prevented from entering the fuel cell unit 36.

In addition, in the embodiment described above, the air guide plate 34 may be formed separately from the side cover 33 and joined to the side cover 33 by action of a specific fastening tool, or may be formed integrally with the side cover 33 so as to be continuous from the side cover 33.

What is claimed is:

1. A saddle-ride vehicle, comprising:
a vehicle body frame steerably supporting a front fork by a head pipe and swingably supporting a rear wheel unit around a pivot,
an air-cooled fuel cell unit supported by the vehicle body frame on a rear side of the head pipe and including an outside air intake port facing forward, and
a vehicle body cover defining a front of an intake air space that is connected to the intake port,
wherein the vehicle body cover includes a traveling air passage that changes a direction of traveling air that flows in from a front,
wherein the traveling air passage includes a turning portion on a rear side of the intake port, the traveling air passage guiding the traveling air toward the front,
wherein the vehicle body cover includes a front wall and side walls, the front wall covering a front of the intake port, the side walls extending rearward of the vehicle from the front wall,
left and right intake air ports are defined in the side walls, the intake air ports being connected to the intake air space and opening toward a rear, and
the turning portion includes an air guide plate joined to the side wall on a rear side of the intake air port, the air guide plate covering the intake air port and forming a traveling air intake port that opens toward the front.

2. The saddle-ride vehicle according to claim 1, wherein the air guide plate is arranged so as to extend outwardly as going forward of the vehicle.

3. The saddle-ride vehicle according to claim 1, wherein the side wall includes a first guide portion that forms the intake air port, the first guide portion being arranged so as to extend outwardly as going rearward of the vehicle.

4. The saddle-ride vehicle according to claim 3, wherein the intake air port is positioned on the rear side of the intake port.

5. The saddle-ride vehicle according to claim 4, wherein the side wall includes a fuel cell cover portion, a front end of the fuel cell cover portion including a second guide portion that is folded so as to be oriented to the fuel cell unit.

6. The saddle-ride vehicle according to claim 1, wherein an opening is provided in the air guide plate, the opening opening between the intake air port and a rear end of the air guide plate.

7. The saddle-ride vehicle according to claim 6, wherein the opening is disposed so as to deviate to an upper edge or a lower edge of the air guide plate.

8. The saddle-ride vehicle according to claim 1, wherein the vehicle body cover includes an inlet cover covering a second intake air port and including a traveling air passage, the second intake air port being defined in the front wall of the vehicle body cover, the traveling air passage changing a direction of traveling air that flows in toward the second intake air port from the front.

9. The saddle-ride vehicle according to claim 2, wherein the side wall includes a first guide portion that forms the intake air port, the first guide portion being arranged so as to extend outwardly as going rearward of the vehicle.

10. The saddle-ride vehicle according to claim 2, wherein an opening is provided in the air guide plate, the opening opening between the intake air port and a rear end of the air guide plate.

11. The saddle-ride vehicle according to claim 2, wherein the vehicle body cover includes an inlet cover covering a second intake air port and including a traveling air passage, the second intake air port being defined in the front wall of the vehicle body cover, the traveling air passage changing a direction of traveling air that flows in toward the second intake air port from the front.

* * * * *